United States Patent Office 3,428,825
Patented Feb. 18, 1969

3,428,825
SAFETY LOGIC CIRCUIT OF THE AND TYPE
Gerard Martin, Noisy-le-Sec, France, assignor to Société Anonyme dite Compagnie des Freins et Signaux Westinghouse, Paris, France, a French society of France
Filed Mar. 26, 1965, Ser. No. 442,930
Claims priority, application France, Apr. 3, 1964, 969,618
U.S. Cl. 307—218                6 Claims
Int. Cl. H03k 19/22, 19/30

ABSTRACT OF THE DISCLOSURE

An electronic memory for use with automatic signaling devices having a transistor with first and second circuit control means. The first control circuit has an input connected to a pulse generator and its output connected to the transistor, which output also corresponds to the output of the memory and is connected to the input of the second control circuit. The other input of the memory is connected to a triggering circuit.

---

The safety conditions required both in general industrial installations of electronically operated gates or barriers and for controlling motor vehicle traffic at a railway crossing in particular, require information or data means which is extremely reliable and fail-safe in operation. It is important that if any one of the components of a specific operational system is at fault, the output signal issuing therefrom shall remain in or pass into a state such that the information or data transferred is most restricted, i.e. always in the sense of the safety required for the given installation.

In particular, electronic semi-conductor memories produced up to the present have the disadvantage that if an element is accidentally short-circuited or cut off, for example a transistor, the output information gives rise to a signal which can in no way be differentiated from that produced respectively by the states of conduction or nonconduction of the transistor in question, these states being conditioned in normal operation by the input signal applied to the circuit.

The present invention has for an object to remedy these disadvantages by providing an electronic memory allowing the discrimination of these accidental states over the states of normal operation thereof; thus, if one of its components is defective, the memory remains indefinitely in a stable state so that the output signal acquires a binary value corresponding to the safety position of the member controlled by said memory.

To this end, the present invention comprises an electronic safety memory comprising in combination: a transistor or like electronic device of similar operation, connected to a source of direct current; a first control circuit for the transistor and connected to a pulse generator; an output circuit for the transistor delivering a signal, the only two possible values of which correspond to the presence and to the absence of a pulse; a second control circuit for the transistor connected to the output of the memory, and a circuit for triggering the memory connected to the control element of the transistor.

The pulse generator preferably used with the memory of this invention is of the type which produces a continuous sinusoidal signal and applies that signal directly to the base of the input transistor. This transistor transforms the sinusoidal signal into a signal having a rectangular or square wave form to be applied to the memory.

Figure 1:
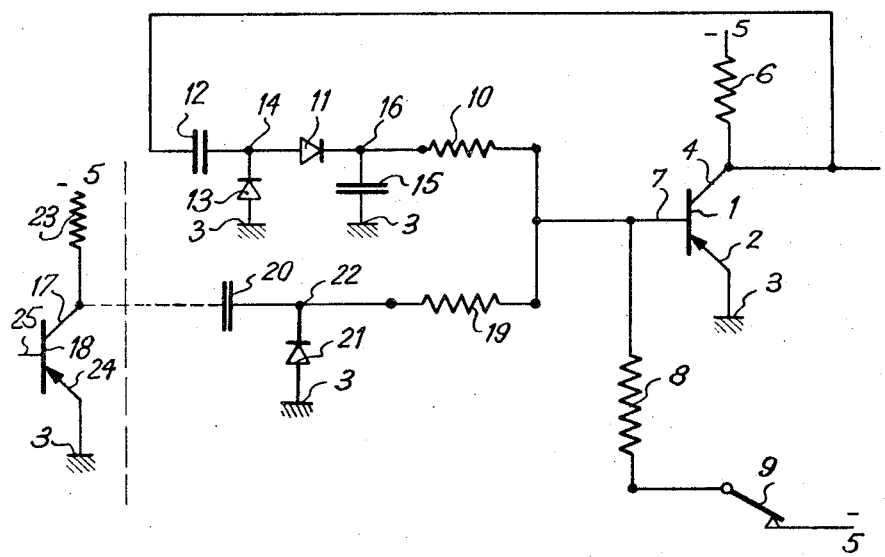
Figure 2:
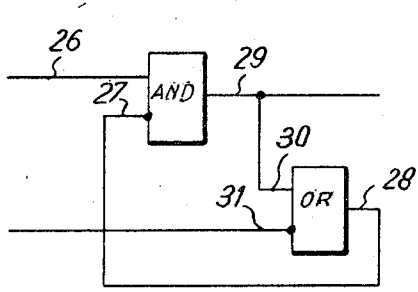
Figure 3:
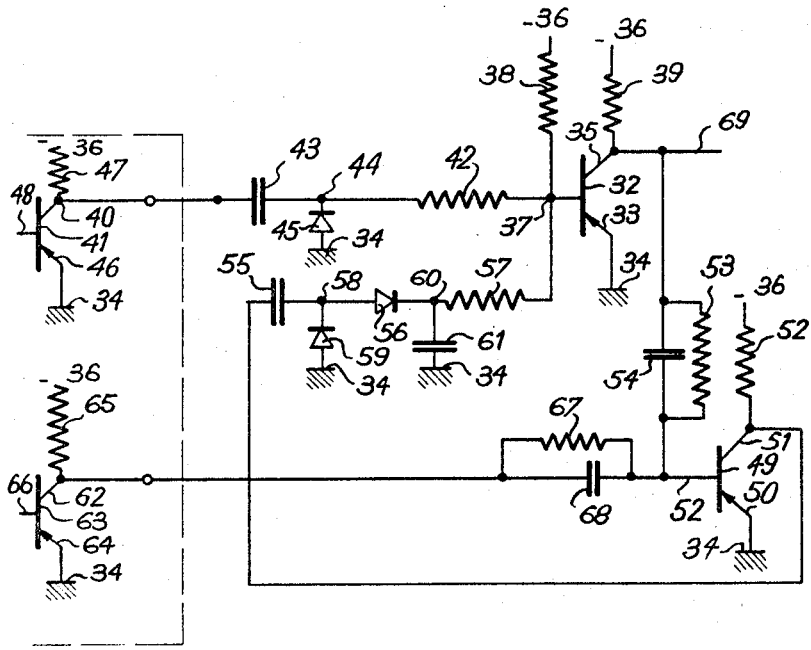
Figure 4:
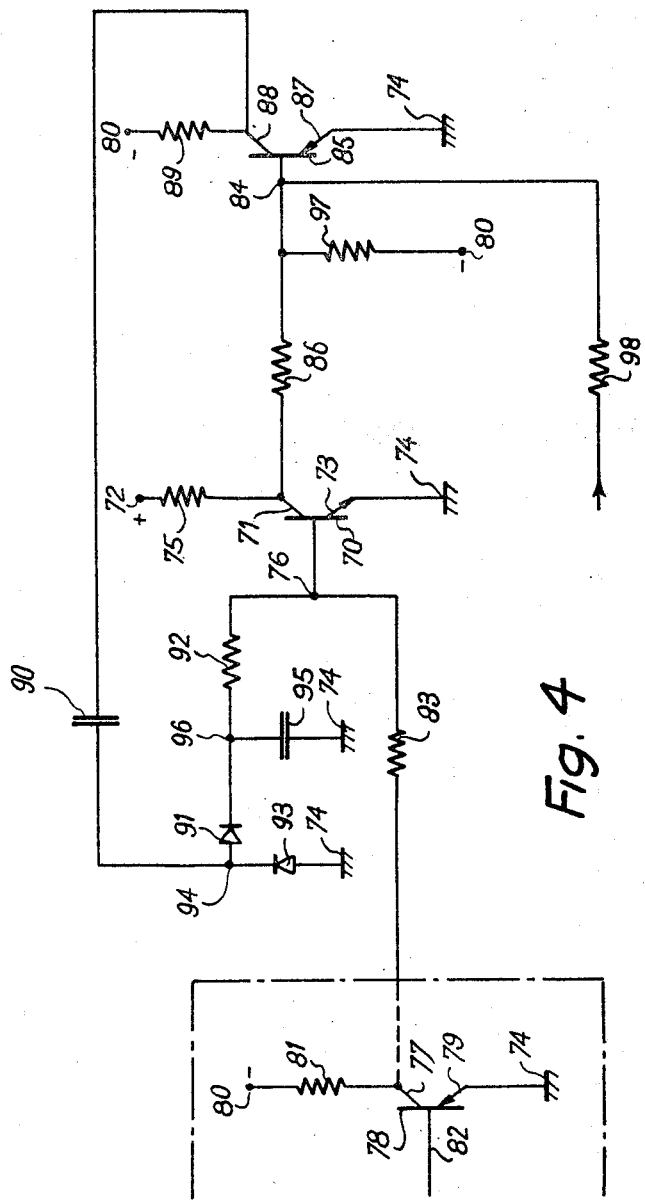

Other complementary characteristics of the invention will appear from the description to follow, reference being made to the accompanying drawings. It will be understood that the description and drawings are given only by way of example and in no way limit the invention. In these drawings:

FIGURE 1 shows an electrical circuit diagram of one embodiment of a memory according to the invention, FIGURE 2 shows a simplified logic diagram of a second embodiment of a memory according to the invention, obtained by the combination of logic safety circuits of the AND type and of the OR type, FIGURE 3 shows an electrical circuit diagram corresponding to the logic diagram of FIGURE 2, and FIGURE 4 shows an electrical circuit diagram of a third embodiment of a memory according to the invention.

Referring now to the drawings, FIGURE 1 shows a memory according to the invention which comprises a transistor 1 of the PNP type, the emitter 2 of which is connected to a terminal 3 of a source of direct current (not shown in the figure). The collector 4 of the transistor 1 is connected to the second terminal 5 of said source through a resistor 6.

The terminal 5 of the D.C. source is the negative terminal, the positive terminal 3 of said source being connected to ground.

The base 7 of the transistor 1 is connected to the negative terminal 5 of said source through a resistor 8. A manually or automatically controlled switch 9 is inserted between the resistor 8 and the terminal 5.

The base 7 of the transistor 1 is connected to the collector 4 through a resistor 10, a rectifier 11 and a capacitor 12, these three elements being in series.

A rectifier 13 is connected between the terminal 14, common to the capacitor 12 and rectifier 11, and ground 3. A capacitor 15 is connected between the terminal 16, common to the rectifier 11 and to the resistor 10, and ground 3.

The base 7 of the transistor 1 is also connected to the collector 17 of a transistor 18 of the PNP type through a resistor 19 and a capacitor 20 in series. A rectifier 21 is connected between the terminal 22, common to the resistor 19 and the capacitor 20, and ground 3.

The collector 17 of the transistor 18 is connected to the negative terminal 5 of the D.C. source of electrical supply through a resistor 23, the emitter 24 being connected to ground 3. The base 25 of this transistor is connected to a pulse generator (not shown in the drawing).

The rectifiers 11, 13 and 21 may be constituted by diodes. The diode 11 is connected in such a way that a current passes through it in the direction: terminal 14— terminal 16. The diode 13 is connected in such a way that a current passes through it in the direction: ground 3— terminal 14. The diode 21 is connected in such a way that a current passes through in the direction: ground 3— terminal 22.

The circuit arrangement, comprising the transistor 1 and the resistors 6, 8, 10 and 19, constitutes a logic safety circuit of the AND type, the control circuits being represented by the resistors 10 and 19.

When the transistor 18 transmits no pulse, the transistor 1 is permanently cut off if the switch 9 is in the open position. The transistor 1 is, on the contrary, permanently saturated if the switch 9 is in the closed position. In both cases, no pulse appears on the collector of the transistor 1.

A pulse transmitted by the transistor 18 causes the potential of its collector 17 to pass alternately from the value 0 volt (saturated transistor 18) to the value −U volts (transistor 18 cut off), U representing the amplitude of the voltage of the D.C. source.

Due to the presence of the capacitor 20 and of the diode 21, this pulse causes the potential of the terminal 22 to pass alternately from the value 0 to a value +U volts.

The resistors 8 and 19 are selected so that the voltage pulse which appears at the terminal 22 can in no case cut off the transistor 1 when the switch 9 is in the closed position. This transistor remains at saturation point and no pulses appear on its collector 4.

When the switch 9 is opened, the transistor 1, having no possibility of allowing the flow of an emitter-base discharge, is cut off. The potential of the collector 4 then passes from the value 0 to the value —U volts. The capacitor 12 is loaded through the circuit: ground 3— diode 13—collector 4 of the transistor 1—resistor 6— negative terminal 5 of the D.C. source.

The plate of the capacitor 12 that is connected to the diode 13 is positively charged. When the switch 9 returns to the rest position, i.e. to the closed position, the transistor 1 returns to saturation.

The capacitor 12 is then discharged through the circuit: ground 3—emitter-collector junction of the transistor 1— diode 11—capacitor 15—ground 3. The capacitor 15 stores this discharge pulse of the capacitor 12, and its plate connected to the terminal 16 is positively charged to a potential which is very near the value +U volts.

The pulse produced by the transistor 18 is transmitted by the transistor 1. There is a moment, during the positive half-wave of the pulse appearing at the terminal 22, when, the terminal 16 of the resistor 10 remaining at a potential which is very near the value +U volts, the terminal 22 of the resistor 19 is also taken to this potential.

The resistors 8, 10, 19 are selected so as to form a voltage-dividing bridge enabling the base 7 of the transistor 1 to be taken to a potential which is slightly higher than ground potential when the resistors 10 and 19 are simultaneously at the potential +U volts.

The capacitor 12 is charged again. When the potential at the terminals of the resistor 19 tends towards ground potential, during the following half-wave of the pulse transmitted by the transistor 18, the transistor 1 is saturated again.

The resistors 10 and 19 are selected so as to maintain the transistor 1 saturated when one of the amplitudes of the signals appearing at the terminals 16 and 22 is nil, and cut off when the amplitudes of these signals are both equal to their maximum value.

Thus the transistor 1 pulses at the frequency of the pulses transmitted by the transistor 18, the pulses transmitted by the transistors 1 and 18 being in phase opposition.

If 0 designates the binary state of the input signal transmitted by the transistor 18 in the absence of pulses and I designates the binary state of this signal in the presence of pulses, the signal appearing at the output of the memory, i.e. on the collector 4 of the transistor 1, is in the binary state 1 if the input signal is in the state I and if the switch 9 has been opened and then closed. In all the other cases, the output digit appearing on the collector 4 of the transistor 1 is in the state 0.

When the pulse transmitted by the transistor 18 disappears, the switch 9 being in rest, i.e. closed, position, the transistor 1 remains conductive even after the pulses transmitted by the transistor 18 are stopped.

The capacitor 15 completely discharges, and the potential of the terminals 16 is taken to the value 0, thus confirming the state of conduction of the transistor 1.

The memory passes into the rest or quiescent condition and the output digit is nil. The memory remains in this state even if a pulse is transmitted again by the transistor 18.

The following table summarizes the different faults capable of affecting the components of the memory which has just been described, and indicates the output signals produced by its faults.

| Element in question | Disconnection | Short-circuit |
| --- | --- | --- |
| Transistor 1 | The transistor 1 no longer oscillates; output digit—S=0. | The transistor 1 no longer oscillates, S=0. |
| Resistor 6 | The transistor 1 cannot oscillate—S=0. | The transistor 1 is destroyed and cannot oscillate—S=0. |
| Resistor 10 | The potential +U appearing at the terminal 16 is not transmitted to the transistor 1 which cannot be cut off—S=0. | Cannot be short-circuited by construction. |
| Resistor 19 | The recurrent signal appearing on the terminal 22 is not transmitted to the transistor 1 which cannot be cut off—S=0. | Do. |
| Resistor 8 | The transistor 1 can no longer be saturated—S=0. | Do. |
| Capacitor 22 | The capacitor 15 can no longer be positively charged. The transistor 1 cannot be cut off—S=0. | Impossibility of obtaining the voltage +U on the terminal 16. The transistor 1 is no longer cut off—S=0. |
| Capacitor 15 | The potential of the terminal 16 remains at 0 v. Impossibility of the transistor 1 being cut off—S=0. | The potential of the terminal 16 remains at 0 v. The transistor 1 remains saturated—S=0. |
| Diode 21 | The current passing through the resistor 19 is insufficient to cut off the transistor 1—S=0. | The terminal 22 remains at the potential 0 v. The transistor 1 remains saturated—S=0. |
| Diode 13 | The capacitor 12 can no longer become charged. The transistor 1 is always saturated—S=0. | The terminal 16 remains at the potential 0 v. The transistor 1 remains saturated—S=0. |
| Diode 11 | The resistor 10 is isolated. The transistor 1 remains saturated—S=0. | The capacitor 15, of high value, integrates the oscillation. The resistor 10 is short-circuited and its potential is nil. The transistor 1 is saturated—S=0. |
| Capacitor 20 | Disappearance of the voltage +U appearing on the terminal 22—S=0. | Disappearance of the voltage +U appearing on the terminal 22—S=0. |

Thus, whatever may be the faults capable of affecting the components of the memory, after studying this table, it may be seen that the output digit appearing on the collector 4 of the transistor 1 is nil.

The circuit which has just been described enables data or information to be memorised, this method being constituted by the opening, then the shutting of the switch 9, constituting the essential element of the circuit for triggering the memory, on condition that the transistor 18 or any suitable member transmits a recurrent signal.

Any of the embodiments of this invention may be utilized in a circuit for automatically controlling the gate or barrier at a railway crossing and would operate as follows. When a train appoaches the crossing controlled by the gate, a first sensing means, such as an electrical switch (not shown) would be activated by the train. The activation of this switch causes the pulse generator to be stopped momentarily, thus causing the memory to register the digit 0 at its output (4 of FIG. 1). When this output of 0 is registered, a relay (not shown) or some equivalent means, is cut-off and the gate or barrier is automatically lowered to stop road traffic. After the passage of the train the first switch restarts the pulse generator for reapplying continuous pulses to the transistor 18, but these pulses are not transmitted to the output 4 of the memory because the other entry (triggering circuit switch 9) of the memory does not transmit pulses for the instant. Therefore, even though the generator has been restarted the gate remains lowered because the digit 0 still appears at the output of the memory. The gate remains in this lowered position until the train has passed a second sensing means (not shown) placed a predetermined distance from the crossing. This second sensing means first opens and then closes the switch 9. Upon closing the switch, after the passage of the train, the memory again registers the digit 1 at its output thereby exciting the relay to raise the gate and allow traffic to pass.

If a short-circuit or some other breakdown appears in the memory, the digit 0 appears at the output 4, the relay is deactivated and the gate is either lowered or remains closed. Therefore, this memory is completely safe in operation since in case of any malfunction the gate is automatically lowered, therefore, remaining in its most restrictive safety position.

The logic circuit shown in FIGURE 2 shows a second embodiment of a memory according to the invention.

As is shown, this memory essentially comprises a logic safety circuit of the AND type, and a logic safety circuit of the OR type, these circuits have been described respectively in patent application Ser. No. 423,521 filed Jan. 5, 1965 for Logical Safety Circuit of the AND Type by the applicant and patent application Ser. No. 423,522 filed Jan. 5, 1965 for Logical Safety Circuit of the OR Type by the applicant.

The first control circuit for the AND gate or circuit, and having the reference 26, is connected to a pulse generator. The second control circuit having the reference 27 is connected to the output 28 of the OR gate or circuit. The output 29 of the AND gate or circuit is connected to the first control circuit, having the reference 30, of the OR gate or circuit. The second control circuit, having the reference 31, of the OR gate or circuit is connected to a second pulse generator (not shown on the figure), or to any other means for triggering the memory. The output 29 of the AND gate or circuit also constitutes the output of the memory.

The electrical circuit diagram shown in FIGURE 3 is the equivalent of the logic diagram shown in FIGURE 2.

As FIGURE 3 shows, the memory comprises a transistor 32 of the PNP type, the emitter 33 of which is connected to the terminal 34 of a source of direct current. The collector 35 of the transistor is connected to the second terminal 36 of said source, through a resistor 39. The terminal 36 shows the negative terminal of the D.C. source, the positive terminal 34 being connected to ground. The base 37 of the transistor 32 is connected, on the one hand, to the negative terminal 36 of said source through a resistor 38, and, on the other hand, to the collector 40 of a transistor 41 of the PNP type through a resistor 42 and a capacitor 43 in series. The common terminal 44 between the resistor 42 and the capacitor 43 is connected to ground 34 through a rectifier 45.

The emitter 46 of the transistor 41 is connected to ground 34 whilst the collector 40 is connected to the negative terminal 36 of the D.C. source through a resistor 47. The base 48 is connected to a pulse generator (not shown on the figure) or any other generator of recurrent pulses.

A transistor 49 of the PNP type has its emitter 50 connected to ground 34 and its collector 51 connected to the negative terminal 36 of the D.C. source through a resistor 53. The base 52 of the transistor is connected to the collector 35 of the transistor 32 through a resistor 53 and a capacitor 54 connected in parallel.

The collector 51 of the transistor 49 is connected to the base 37 of the transistor 32 through a capacitor 55, a rectifier 56 and a resistor 57 in series. The terminal 58 common to the capacitor 55 and the rectifier 56 is connected to ground 34 through a rectifier 59. The terminal 60 common to the rectifier 56 and to the resistor 57, is connected to ground 34 through a capacitor 61.

The base 52 of the transistor 48 is connected to the collector 62 of a transistor 63 of the PNP type, through a resistor 67 and a capacitor 68 connected in parallel. The emitter 64 of this transistor is connected to ground 34, the collector 62 being connected to the negative terminal 76 of the D.C. source through a resistor 65. The base 66 of the transistor 63 is connected to a pulse generator or any other means capable of producing pulses.

The rectifiers 45, 56, 59 may be constituted by diodes. The diode 45 is connected so that a current passes through it in the direction from ground 34 to the terminal 44. The diode 56 is connected so that a current passes through it in the direction from terminal 58 to terminal 60. The diode 59 is connected so that a current passes through it in the direction from ground 34 to terminal 58.

The resistor 42, the capacitor 43 and the diode 45 represent the first control circuit having the reference 26 in FIGURE 2. The capacitors 55 and 61, the diodes 56 and 59 and the resistor 57 represent the second control circuit having the reference 27 in FIGURE 2. These two control circuits, the transistor 32 and the resistors 38 and 39 constitute a logic safety circuit of the AND type.

The resistor 53 and the capacitor 54 represent the first control circuit having the reference 30. The resistor 67 and the capacitor 68 represent the second control circuit having the reference 31. These two control circuits, the transistor 49 and the resistor 52 form a logic safety circuit of the OR type.

The output of the memory is constituted in FIGURE 3 by a conductor 69 connected to the collector 35 of the transistor 32.

The AND logic circuit shown in FIGURE 3 is identical to the AND logic circuit shown in FIGURE 1, the second control circuit of these logic circuits each comprise an integrating device.

The operation of this memory is substantially identical to the functioning of the memory previously described and shown in FIGURE 1.

When the control circuit of the AND circuit, only has a recurrent signal passing therethrough, no pulse appears on the collector 35 of the transistor 32.

The output digit of the memory picked up on the conductor 69 is then nil.

When the second control circuit of the OR circuit has a recurrent signal passing therthrough, a pulse appears on the collector 51 of the transistor 49. This pulse is transmitted to the second control circuit of the AND circuit which transforms it into a signal of constant value. Two control signals are then applied to the base 37 of the transistor 32 of the AND circuit and the collector 35 transmits a pulse having a frequency equal to that transmitted by the transistor 41. The memory is in service and by using the binary denomination previously referred to, the output digit of the memory picked up at the output 69 is in the I state.

In the embodiment in question, the circuit for triggering the memory is constituted by the second control circuit of the logic OR circuit, the triggering signal being formed by a recurrent signal. The same memory may be produced by using a triggering circuit of the type shown in FIGURE 1, i.e. with the aid of a switch, a single oscillation being sufficient for putting the OR circuit into service.

In the same way, the circuit for triggering the memory shown in FIGURE 1 may be obtained from a generator of recurrent pulses located in the position of the switch 9.

As has been shown in the above-mentioned patent applications, the digit appearing at the output of the memory obtained by the combination of the safety circuits of the AND type and of the OR type, is in the state 0, if any one of the components of the logic circuits of the said memory is at fault.

The electrical circuit diagram shown in FIGURE 4, shows a third embodiment of a memory according to the invention, this memory being obtained from an AND logic safety circuit of the type described in patent Ser. No. 423,521, filed Jan. 5, 1965 for Logical Safety Circuit of the AND Type by the applicant. This logic safety circuit is essentially characterized in that the input signals are of opposite sign.

As shown in FIGURE 4, the memory comprises a transistor 70 of the NPN type, the collector 71 of which, is connected to the positive terminal 72 of a first source of direct current through a resistor 75. The emitter 73 of the transistor 70 is connected to the second terminal 74 of this first source which is connected to ground. The base 76 is connected to the collector 77 of a transistor 78 of the PNP type through a resistor 83, the emitter 79 of which transistor 78 is connected to ground 74. The collector 77 of the transistor 78 is connected to the positive terminal 80 of the second source of direct current through a resistor 81. The base 82 of the transistor 78 is connected to a pulse generator (not shown in the figure) or to any other element operating in the same fashion. The collector 71 of the transistor 70 is connected to the base 84 of a transistor 85 of the PNP type through a resistor 86. The emitter 87 of the transistor 85 is connected to ground 74 and the collector 88 is connected to the negative terminal 80 of the second D.C. source through a resistor 89.

The collector 88 of the transistor 85 is connected to the base 76 of the transistor 70 through a capacitor 90, a rectifier 91 and a resistor 92, these elements being connected in series, and the resistor 92 being connected to the base 76.

A rectifier 93 is connected between ground 74 and the terminal 94, common to the capacitor 90, and to the rectifier 91. A capacitor 95 is connected between ground 74 and the terminal 96 common to the rectifier 91 and the resistor 92.

The base 84 of the transistor 85 is connected to the negative terminal 80 of the second D.C. source through a resistor 97.

The circuit for triggering the memory comprises a pulse generator (not shown in the drawing), connected to the base 84 of the transistor 85 through a resistor 98.

When the memory is energised, i.e. fed with a voltage, the transistors 70 and 85 are cut off. No pulse is present on the collectors 71 and 88 of these transistors. By using the same binary denomination as specified previously, the output digit of the memory is in the state 0.

The output digit of the memory remains at 0 when a pulse or a recurrent signal is transmitted by the transistor 78. In order to put the memory into action a pulse or a series of synchronous pulses is sent with the signal delivered by the transistor 78, but phase shifted by 180°, so as to cause the transistor 85 to swing from a cut-off state to one of saturation. The signal collected on the collector 88 is transmitted to the base 76 of the transistor 70 after having been integrated. The base 76 then accepts the two control signals and according to the method described in the patent application mentioned above, a signal is recurrently collected on the collector 71. This signal is transmitted by the transistor 85 and the memory remains in operation even after the disappearance of the triggering signal transmitted by the resistor 98. The output digit of the memory is at I.

As has been shown previously, in the above-mentioned patent applications, the digit appearing at the output of the memory is at 0 if any one of its components is at fault.

In the example shown in FIGURE 4, the triggering circuit is connected to the base of a transistor 85. The same memory may be produced by connecting the triggering circuit to the base 76 of the transistor 70, the signal transmitted by the triggering circuit being arranged to trigger the transistor 70.

The capacitors 15, 61, and 95 of the various embodiments of the memory may be replaced by capacitors having four terminals, improving the safety conditions.

The previously described embodiments have been obtained from logic safety circuits of the AND type and of the OR type. The invention is not limited to these embodiments alone, but also covers all modifications thereof which are capable of being produced from these safety circuits by any new combination.

I claim:

1. An electronic safety memory for delivering an output signal corresponding to the most restrictive safety position in the case of a fault in one of the components of the memory comprising,
   a first transistor having a collector connected to a source of direct current, said transistor having first and second control circuits,
   a pulse generator having an output connected as an input to said first control circuit, the output of said first transistor being connected to the input of said second control circuit,
   a second transistor having a collector connected to a second source of direct current and having a base connected to the collector of said first transistor and through a resistor to said second source, and
   a triggering circuit connected to the base of said second transistor, the output of said memory being taken from the collector of said second transistor.

2. An electronic safety memory for delivering an output signal corresponding to the most restrictive safety position in the case of a fault in one of the components of the memory comprising,
   a transistor having a collector connected to a source of direct current, said transistor having first and second control circuits,
   a pulse generator having an output connected as an input to said first control circuit,
   an output of said transistor, comprising the output of said memory, being connected as an input to said second control circuit, and
   a triggering circuit comprising switch means having a first terminal connected to the collector of said transistor and a second terminal connected through a resistor to the base of said transistor.

3. An electronic logic safety circuit comprising:
   an element switchable between an active and an inactive state having at least two output electrodes and a control electrode;
   means connecting said output electrodes in series with a D.C. source;
   output means connected to a first one of said output electrodes for exhibiting a safe signal when said element assumes an active state and an alarm signal when said element assumes an inactive state,
   first control circuit means coupled to said control electrode and adapted to be energized by a pulse generator whereby said control circuit means applies a first switching voltage to said element,
   second control circuit means coupled to said control electrode for selectively applying a second switching voltage to said element,
   said element being switchable from said inactive to said active state upon the simultaneous application of said first and second switching voltages,
   feedback circuit means comprising a transistor connected between said first output electrode and said second circuit control means for applying an actuating signal to said second control means; and
   a trigger circuit connected to control said transistor.

4. A circuit as described in claim 3 wherein said second control circuit means includes a capacitor, a diode and a resistor connected in series between said feedback circuit means and said control electrode;
   a second diode coupling the common junction of said capacitor and said diode to said D.C. source; and
   a second capacitor coupling the common junction of said diode and said resistor to said D.C. source.

5. A circuit as described in claim 4 wherein said feedback circuit means includes a transistor having two output electrodes and a control electrode;
   the control electrode being connected to said output means and coupled to said trigger means;

the output electrodes of said transistor being connected in series with said D.C. source; and said capacitor being connected to a first output electrode of said transistor.

6. A circuit as described in claim 4 wherein said first control circuit means includes a second resistor connected in series between said control electrode and a first terminal of a third capacitor;

a third diode coupling said first terminal to said D.C. source; and a second terminal of said third capacitor adapted to be energized from the pulse generator.

References Cited

UNITED STATES PATENTS

| 3,104,327 | 9/1963 | Rowe | 307—88.5 |
| 3,132,303 | 5/1964 | Rall | 307—88.5 |
| 3,187,201 | 6/1965 | Eastman et al. | 307—88.5 |
| 3,266,032 | 8/1966 | Buhler | 340—31 |
| 3,192,484 | 6/1965 | Carroll | 307—88.5 X |
| 3,193,781 | 7/1965 | Martner | 307—88.5 X |
| 3,223,929 | 12/1965 | Hofstad et al. | 307—88.5 X |
| 3,292,000 | 12/1966 | Chow | 307—88 |

ARTHUR GAUSS, *Primary Examiner.*

HAROLD A. DIXON, *Assistant Examiner.*

U.S. Cl. X.R.

307—238